United States Patent

Chow et al.

[11] Patent Number: 5,257,251
[45] Date of Patent: Oct. 26, 1993

[54] SINGLE LOOP SERVO-POSITIONING SYSTEMS HAVING MEANS FOR CHANGING THE DYNAMIC RANGE OF A POSITION-ERROR SIGNAL WITH SPEED OF THE RELATIVELY MOVABLE MEMBERS

[75] Inventors: W. Wai-Chung Chow; Alan A. Fennema, both of Tucson, Ariz.

[73] Assignee: International Business Machines Corporation, Armonk, N.Y.

[21] Appl. No.: 764,264

[22] Filed: Sep. 23, 1991

Related U.S. Application Data

[63] Continuation-in-part of Ser. No. 528,527, May 25, 1990, abandoned.

[51] Int. Cl.$^5$ .............................................. G11B 7/095
[52] U.S. Cl. ............................... 369/44.25; 369/44.29; 369/44.35; 369/44.28; 360/78.06; 360/78.14
[58] Field of Search ............... 369/44.25, 44.26, 44.27, 369/44.28, 44.29, 44.31, 44.32, 32, 43, 44.35, 44.36; 360/78.01, 78.04, 78.06, 78.07, 78.09, 78.14; 358/342

[56] References Cited

U.S. PATENT DOCUMENTS

| | | |
|---|---|---|
| 4,217,612 | 8/1980 | Matla et al. |
| 4,435,797 | 3/1984 | Hsieh et al. |
| 4,510,537 | 4/1985 | Yoshida et al. |
| 4,575,776 | 3/1986 | Stephens et al. |
| 4,607,201 | 8/1986 | Koenig |
| 4,839,876 | 6/1989 | Fennema |
| 4,876,679 | 10/1989 | Mukai |
| 4,914,725 | 4/1990 | Belser et al. ............ 360/77.08 |
| 4,959,823 | 9/1990 | Getreuer et al. |

FOREIGN PATENT DOCUMENTS

| | | |
|---|---|---|
| 0167177 | 1/1986 | European Pat. Off. |
| 3604604 | 9/1986 | Fed. Rep. of Germany |

Primary Examiner—Aristotelis Psitos
Assistant Examiner—P. W. Huber
Attorney, Agent, or Firm—H. F. Somermeyer

[57] ABSTRACT

A single loop servo is used for positioning a lens holding element with respect to an optical disk. The dynamic range of the error signal used in the positioning is dynamically frequency shifted such that the servo summing of the error signal with a reference signal (velocity reference) is always performed within the same dynamic range. This action simplifies circuit operation as the dynamic range of the error signal is compressed at high speeds. Two embodiments of the invention are described.

11 Claims, 2 Drawing Sheets

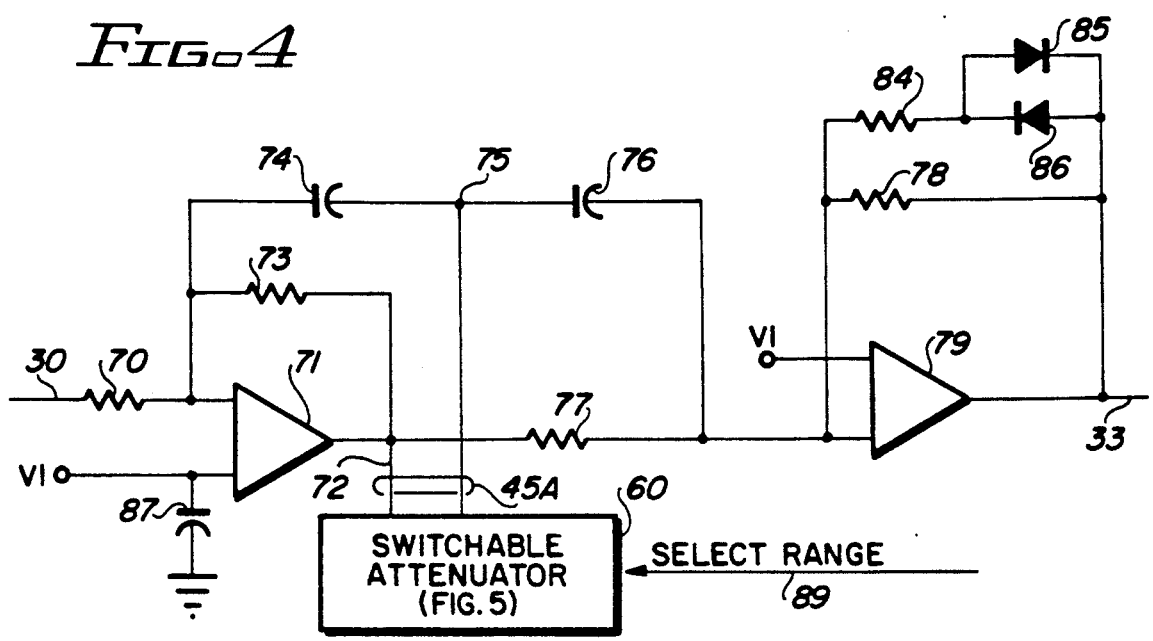
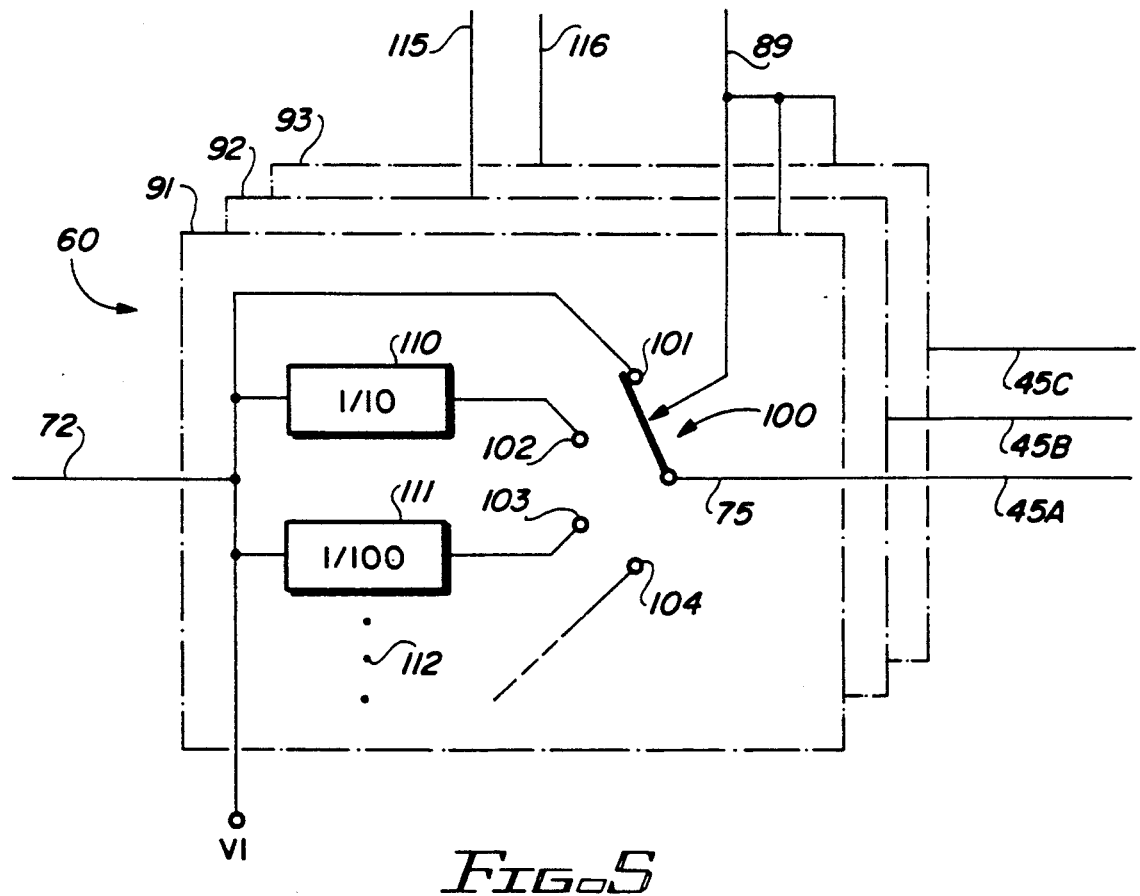

SINGLE LOOP SERVO-POSITIONING SYSTEMS HAVING MEANS FOR CHANGING THE DYNAMIC RANGE OF A POSITION-ERROR SIGNAL WITH SPEED OF THE RELATIVELY MOVABLE MEMBERS

This application is a continuation in part of Ser. No. 07/528,527, filed May 25, 1990, now abandoned.

DOCUMENT INCORPORATED BY REFERENCE

U.S. Pat. No. 4,839,876 by Fennema is incorporated for its showing of a single loop servo positioning system in an optical disk environment in which the present invention is most advantageously employed.

BACKGROUND OF THE INVENTION

The present invention relates to servo positioning systems, particularly to those servo positioning systems adaptable or particularly useful in recording devices. The present invention relates to a servo positioning control and system which utilizes but a single servo loop for a stop lock position (track following) and for a traversing (track seeking) control.

DISCUSSION OF THE PRIOR ART

Positioning servos have been used for many applications, some of which include magnetic and optical recorders. Most servo positioners have a so-called stop-lock position wherein the tool, transducer or lens, is held at a relatively stable position and a moving mode, which for recorders is termed track seeking. Many of the servo positioners employ a first control loop for the stop lock position and a second control loop in a seeking or moving mode. Switching between the two loops can induce undesired transients, as well as require a substantial number of circuits for the two respective loops. It is desired to use a single loop for both the stop lock and moving functions of servo positioners.

The document incorporated by reference Fennema shows a single loop control for an optical disk recorder which is position controlled throughout; that is relative position of the lens to a track or set of tracks is an independent input variable. It is desired to provide a single loop servo positioning control which uses a velocity mode in the track seeking or traversing function, yet provides an effective stop-lock control.

Another single loop servo positioning control is shown by Matla, et al. in U.S. Pat. No. 4,217,612, which always uses a position error input for controlling the servo; that is, the relative position of a transducer to the magnetic disk, is the independent input variable to be compared with a reference for effecting servo actions. Matla, et al. is cumulative with respect to Fennema. Koenig, U.S. Pat. No. 4,607,201, shows a track-following position control loop i.e., always providing for stop-lock; since the reference does not provide for seeking, it is not pertinent to any of the claims of the present application. Stephens, et al., U.S. Pat. No. 4,575,776, shows a seek or movement control for a positional servo in which a simulated position error signal is used. Hsieh, et al., U.S. Pat. No. 4,435,797, shows a servo position scheme of a classical type in which a separate servo loop is provided for track-following (stop lock) and for seeking. It is known that such separate seek loops have used velocity profile controls for controlling the seek while the track following (stop lock) controls use position error controls.

SUMMARY OF THE INVENTION

It is the object of the present invention to provide a single-loop positioning control in which all modes are controlled by a velocity profile. Stop-lock is controlled by a velocity signal of zero while the velocity control of the loop is provided in a manner for minimizing the dynamic range required in the circuits.

In a positioning servo system for relatively positioning first and second relatively movable members using a motive means operatively connected to the movable members has means for providing an error indicating signal to control the servo which includes a single-loop servo system and sensing means for sensing the relative position of the relatively movable members for indicating the relative position by a position error signal. Servo means process the position error signal in a single-loop having dynamic range changing means for changing the dynamic range of the position error signal and includes position control means connected to the processing means for receiving the dynamic range changed position error signal and for generating a servo drive signal. Output means connected to the position control means receives the servo drive signal for restoring the dynamic range of the servo drive signal to the dynamic range of the generated position error signal. The output means is also connected to the motive means to supply a restored dynamic range servo drive signal to the motive means.

The foregoing and other objects, features and advantages of the invention will be apparent from the following more particular description of preferred embodiments of the invention, as illustrated in the accompanying drawings.

BRIEF DESCRIPTION OF THE DRAWING

FIG. 4 shows a range selection circuit usable in the FIG. 1 illustrated embodiment.

FIG. 5 is a circuit diagram showing a switchable attenuation network used in the FIG. 4 illustration illustrated circuits.

DETAILED DESCRIPTION

Figure 1:
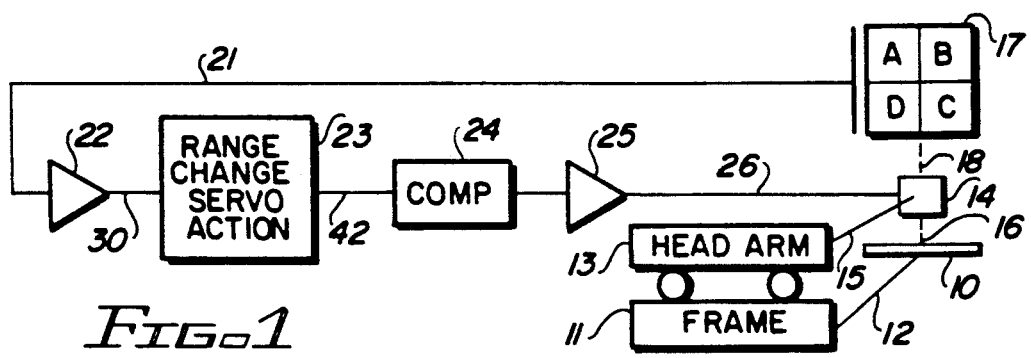
FIG. 1 is a simplified block diagram of a servo positioner using the present invention in an optical disk recorder.

Referring now more particularly to the drawing, like numerals indicate like parts and structural features in the various Figs. An optical disk 10 is mounted for rotation on frame 11 as indicated by dashed line 12. A motor (not shown) suitably rotates the disk 10 speed. A head arm 13 is movably mounted on frame 11 and carries a lens supporting actuator 14 as indicated by dashed line 15. Laser means (not shown) provide a laser beam through the actuator 14 supported lens to travel over bi directional light path 16 to optical disk 10. Optical disk 10 reflects the laser beam along path 16 returning it through the lens (not shown) of actuator 14, thence over light path 18 to a so called quad detector 17. Quad detector 17 consists of four electrically-independent elements A–D. The four light-responsive elements supply separate signal(s) which are combined, using known techniques, to indicate track crossings in a so-called tracking error signal (TES) supplied over line 21. Elements A-D are independently connected to a usual decode circuit, represented by the vertical line at the end of line 21, to generate TES. The TES on line 21 goes through linear amplifier 22 to be supplied over line 30 to range change servo action circuit 23. Circuit 23 responds to the measured or indicated radial speed of laser light beam on path 16 with respect to disk 10 for changing the dynamic rang of TES to a center or reference range, as will become apparent. In this manner all actions in the servo loop for controlling actuator 14 occur within the same dynamic range. Upon completion of the servo control action, the dynamic range of a generated device signal is again changed to the original range of TES and supplied through the usual servo compensator 24, thence through amplifier 25 and over line 26 for being supplied to actuator 14. The document incorporated by reference shows a suitable lens support and actuator 14, as well as its relationship to head arm 13.

Figure 2:
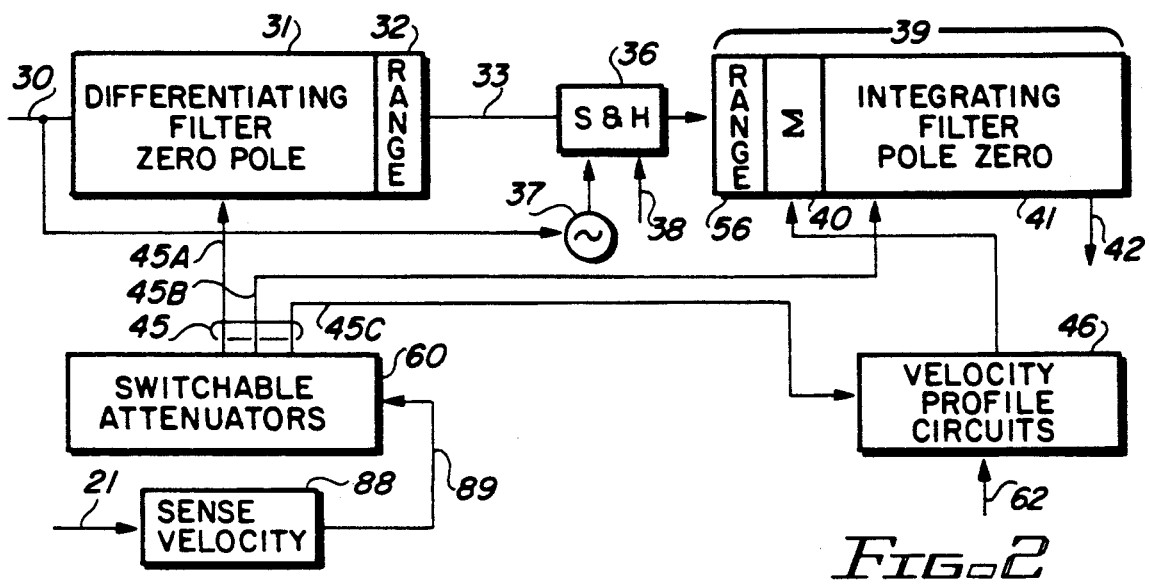
FIG. 2 is a block diagram of a non-linear range-change servo used in the FIG. 1 illustrated system.

FIG. 2 shows TES on line 30 being supplied first to a differentiating filter 31 of the zero-pole type. A dynamic-range control signal on line 45A of line group 45 controls the filter 31 to adjust its operation such that its output signals are dynamic range shifted in accordance with the radial speed of the beam 16 as it traverses radially over disk 10. Range circuit 32 also decreases the dynamic range with radial speed; i.e. both filter 31 and range circuit 32 compress the TES dynamic range. The filter 31 action adjusts dynamic range in steps by stepped attenuator 60 control, as will become apparent. As seen in FIG. 4, filter 31 and range circuit 32 are integrated into one circuit. During track seeking, this range-changed TES travels over line 33, to sample and hold circuit 36. During track seeking, the timed operation of sample and hold circuit 35 can be by an independent oscillator 37 timed to the zero axis crossings of TES on line 30. During track following, a signal on line 38 continuously enables sample and hold circuit 36. The line 38 signal is the usual track following signal commanding a track follow operation.

Sample and hold (S+H) circuit 36 supplies its output to circuit 39. Circuit 39 has a dynamic range decompressing portion 56 which processes the S&H circuit 36 signal to expand the dynamic range to its original range. Note that circuits 32 and 56 operate identically with the filters 31 and 41 zero pole and pole zero providing dynamic range scaling of the signal being processed. Summing circuit 40, in circuit 39, compares the velocity profile circuit 46 signal with the velocity over signal to produce the usual servo correction signal to be dynamic range scaled by integrating filter 41 pole zero to supply a usual servo control signal over line 42. The range scaling is by shifting the zero-poles in filters 31 and 41.

Figure 3:
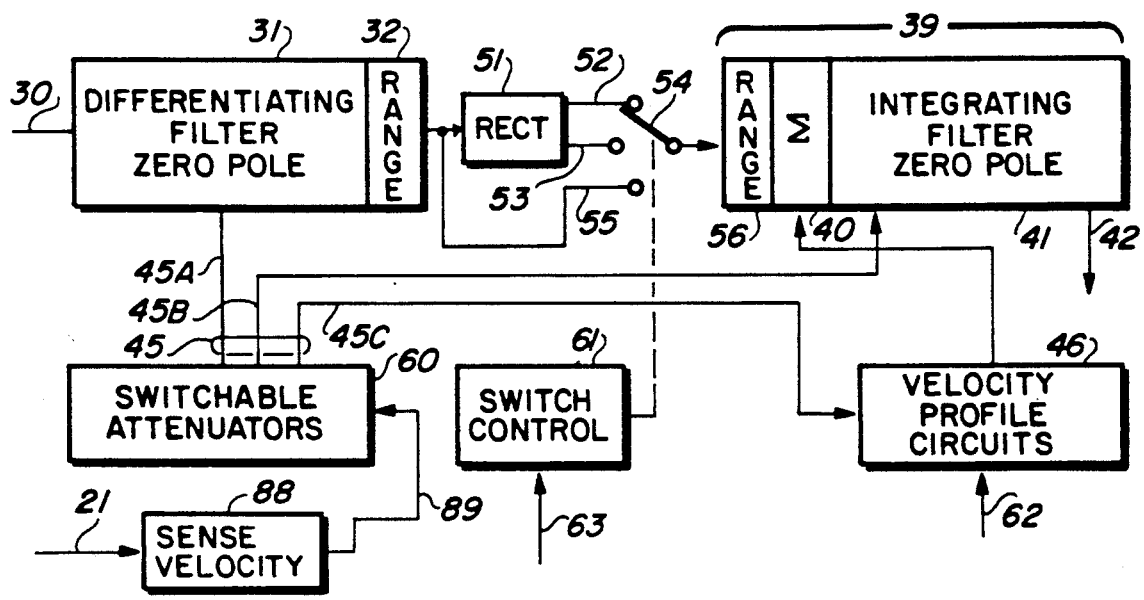
FIG. 3 shows a filter-frequency shifted (linear and range-change servo amplitude expansion (non-linear) circuit.

FIG. 3 shows a second and preferred embodiment of the invention. TES is received over line 30 into the differentiating zero-pole filter 31 which is controlled by a range select signal on line 45A received from range select circuit 60, later described. Dynamic range compressing circuit 32 non linearly compresses the dynamic range of TES to create a range-changed TES. This range-changed TES is supplied to rectifier 51 for use during the seek mode. The range-changed TES travels directly to terminal 55 of switch 54 for use during the track-follow mode. Switch control circuit 61 actuates switch 54 to move to one of the three terminals, as will be later described. In the track seeking mode, a rectified signal having a first polarity on line 52 is used in a radially inward seek, switch 54 then connects line 52 to range circuit 56. For a radial outward seek, the opposite polarity rectified signal from rectifier 51 supplied over line 53 to switch 54 center terminal is connected to range circuit 56. During track-following (stop-lock), switch 54 connects line 55 directly to range circuit 56. This connection supplies the range-changed TES without alteration for track-following control. Thus, there are three servo modes within the single servo loop. A track-following mode (switch 54 connects line 55 to range circuit 56) at which the velocity profile or reference circuits 46 apply a zero reference velocity to summing circuit 40; first seek mode in the radial inward direction, switch 54 connects line 52 to range circuit 56 and a second seek mode in the radial outward direction in which line 53 is connected by switch 54 to range circuit 56. Switch control 61 receives a direction or command control over line 63 to indicate direction of seek while the seek or no seek signal on line 62 controls velocity profile circuits 46 to supply signals in accordance with a predetermined velocity profile to sum circuit 40 or to provide a zero velocity reference signal during track following. A mode control signal in line 62 activates circuit 61 to set switch 54 as described above. Generating seek direction signals and track following signal modes is in accordance with the usual procedure.

FIG. 4 illustrates the operation of the range shifting filters 31 and 41. These filters operate substantially the same, therefore, only filter 31 is described. It is understood that the change between the integrating filter and the differentiating filters is well known and can be readily implemented. TES on line 30 goes through resistor 70 to operational amplifier 71. Line 45 of FIGS. 2 and 3 consist of two lines 72 and 75 for each filter 31 and 41. Line 72 signal carries a signal from the output of operational amplifier 7 to the input of switchable attenuator 60 (FIG. 5). The signal on line 75 from switchable attenuator 60 goes through capacitor 74 to the amplifier 71 input at resistor 70 and is fed forward through capacitor 76 to the amplifier 79 input at resistor 77. Resistor 77 is also connected to the output of operational amplifier 71. A reference input to operational amplifier 71 includes the reference voltage V1 connected to a second input of the operational amplifier. Switchable attenuator 60 responds to the sensed velocity signal on line 89 to select range controls for filters 31 and 41 and velocity profile circuit 46. The line 89 signal is supplied by known sense velocity circuit 88. Circuit 88 derives the speed or velocity signal from the line 21 signal in a known manner, i.e. measures either the frequency or wavelength of the tracking error signal on line 21 to produce a speed indicating signal. One example of sensing the relative radial speed of an optical head lens, lens support and actuator 14 and disk 10 is shown in U.S. Pat. No. 4,914,725. Other speed or velocity sensing circuits may be employed, as is well known. A non-range changed velocity profile can be used for activating attenuator 60 to change ranges.

Switchable attenuator 60 determines the operation of filter 31 by adjusting the operation of operational amplifiers 71 and 79. The output stage of filter 31 consists of operational amplifier 79. Operational amplifier 71 supplies its output signal via resistor 77 to a first input of amplifier 79. A reference signal V1 is supplied to a second input of operational amplifier 79. A bridge circuit 84-86 connects the output line 33 of amplifier 79 to its first input at resistor 77. Oppositely poled diodes 85 and 86 connect the output line 33 to resistor 84 through to resistor 78. Diodes 85 and 86 constitute a non linear dynamic range change in their control of output amplifier 79. Diodes 85 and 86 operate identically in each shifted range of filters 31, 41. Attenuator 60 coacts with the circuit elements 71-77 to dynamically change the effective or apparent capacitance of the FIG. 4 illustrated filter. This capacitance change shifts the frequency of the filter to change its dynamic range scaling.

FIG. 5 shows switchable attenuator 60. Switchable attenuator 60 includes three separate attenuator circuits 91, 92 and 93 respectively for filters 31 and 41 and velocity profile circuit 46. Lines 45A, 45B, and 45C respectively connect the attenuator circuits 91-93 to their respective controlled circuits as best seen in FIGS. 2 and 3. All circuits 91-93 operate in synchronism to select the same attenuation, as will become apparent. Each of the circuits 91-93 are identical, except that the attenuation factors are related to the operation of the respectively controlled filters 31, 41 and velocity profile circuit 46. Circuit 91 is explained, it being understood that the explanation applies to all circuits 91-93. The seek velocity indicating signal on line 89 (from circuit 88 as above described) is supplied to electronic switch 100. Switch 100 is designed to respond to the line 89 signal to selectively connect line 75 (hence line 45A) to input line 72 without attenuation via terminal 101 (slow seek velocity), via 1/10 attenuator 110 by terminal 102 during a relatively high speed portion of a seek or traversal, by 1/100 attenuator 111 by terminal 103 during yet higher speed seeks. Terminal 104 and ellipsis 112 indicate that yet greater attenuations may be employed for enabling a greater velocity of traversal while maintaining servo circuit operation in one dynamic range. Lines 115 and 116, respectively for circuits 92 and 93, correspond to input line 72 or circuit 91. Note that by range changing the output signal of profile circuit 46 to sum circuit 40, all servo parameters are dynamic range changed to be consonant with each other. The components of switchable attenuator 60 may be incorporated into filters 31, 41 and velocity profile circuit 46.

While the invention has been particularly shown and described with reference to preferred embodiments thereof, it will be understood by those skilled in the art that various changes in form and details may be made therein without departing from the spirit and scope of the invention:

What is claimed is:
1. In a positioning servo system which relatively positions first and second relatively moveable members using a motive means operatively connected to the moveable members, the motive means having a drive signal input, the improvement including the combination of:
 a single loop servo having indicating means for indicating relative position and relative speed of the relatively moveable members and indicating said relative position by a first position error signal having a dynamic range varying with said relative speed,
 servo means in the single servo loop for processing the first position error signal and comprising a single loop having dynamic range changing means connected to the indicating means for responding to the indicated relative speed for changing the first position error signal from said dynamic range to a changed position error signal having a constant predetermined dynamic range,
 output means connected to the servo means for receiving the changed position error signal and having means for restoring the dynamic range of the changed position error signal from said constant predetermined dynamic range to the dynamic range of the first position error signal for producing a restored position error signal;
 velocity profile means for supplying a velocity profile signal;
 velocity control means in the output means for receiving the restored position error signal and connected to the velocity profile means for receiving the velocity profile signal and combining the velocity profile signal with the restored position error signal for generating a servo drive signal; and
 the velocity control means being connected to the motive means for supplying the servo drive signal to the motive means.

2. In the system set forth in claim 1, further including, in combination:
 said servo means including an adjustable filter of the zero-pole type for receiving said first position error signal and supplying a filtered signal derived from said first position error signal by said adjustable filter and dynamic range limiting means connected to the adjustable filter for receiving the filtered signal and to derive from said filtered signal and supply said changed dynamic range position error signal; and
 said output means having an adjustable filter of the integrating pole-zero type connected to the velocity control means for receiving the servo drive signal for scaling the dynamic range of the servo drive signal.

3. In the system set forth in claim 1 further including, in combination:
 said servo means and said output means respectively having an adjustable differentiating zero-pole filter and an adjustable integrating pole-zero filter;
 mode control means connected to said servo means and to said output means for actuating said servo means and said output means to shift the pole and zero of said adjustable filters to scale the dynamic range changes and establishing first and second modes of operations; and
 said mode control means in said second mode establishing a dynamic range compression in said servo means and a dynamic range expansion in said output means and in said first mode establishing a constant dynamic range in said servo means and said output means.

4. In the servo positioning system set forth in claim 3, further including an optical recording member having addressable parallel extending tracks and data storing locations in the tracks, in combination:
 a frame movably mounting said optical recording member;
 said second relatively moveable member being said optical recording member, an intermediate member movably mounted on the frame for reciprocating motions transverse to the parallel extending tracks, said intermediate member relatively movably mounting said first relatively movable member for reciprocating motions transversely to the parallel extending tracks; and said indicating means including an objective lens mounted on said first relatively moveable member for optically sensing said data locations and tracks including relative movement of the objective lens transversely to the tracks.

5. In a servo positioning system for relatively moving first and second relatively movable members, motive means responsively connected to the servo positioning system and connected to said members for relatively moving same in response to the servo positioning system, and position sensing means connected to the members and to said servo positioning system for indicating relative position of the members to the servo positioning system as a relative position signal, the improvement including, in combination:

said servo positioning system including a circuit means connected to the position sensing means and having a single signal processing path for receiving and processing the relative position signal to develop a servo drive signal for the motive means and being connected to the motive means for supplying the servo drive signal to the motive means for effecting relative movement between said members;

control means having first and second modes and being connected to the circuit means for activating the circuit means for effecting positioning control on the relatively moveable members, a reference means connected to the circuit means and to the control means for responding to said control means for supplying first and second reference signals to said circuit means, said first reference signal indicating a reference velocity of zero and said second reference signal indicating a predetermined velocity profile for a desired relative velocity-controlled movement of said relatively movable members;

said control means in said first mode actuating the reference means to supply said first control signal to said circuit means, said circuit means responding to said first control signal to position-mode servo control the relative position of said members for servoing said members to a single predetermined relative position of said relatively moveable members;

said control means in said second mode actuating the reference means for supplying said second control signal to the circuit means, said circuit means responding to said second control signal to operate in a velocity servo control mode for effecting a velocity controlled predetermined relative movement of said members between first and second predetermined relative positions of said relatively moveable members;

said circuit means including an input differentiating zero-pole filter having a zero-pole point with an adjustable frequency whereby operation of the zero-pole filter can be changed by adjusting said frequency of the zero-pole point to supply a differentiated analog signal having a constant predetermined dynamic range or a rectified signal and being connected to said control means for responding to said second control signal for changing frequency of said zero-pole of the filter during said second mode;

dynamic range changing means in the circuit means and connected to said zero-pole filter for receiving said analog and rectified signals and connected to the control means for passing said analog signal in said first mode as a given signal and for passing said rectified signal in said second mode as said given signal;

drive signal generating means in the circuit means and being connected to the dynamic range changing means for receiving said given signal in both said first and second modes and comparing said given signal with said first and second reference signals respectively during said first and second modes to generate an intermediate drive signal; and a pole-zero integrating filter in the circuit means an being connected to the generating means for receiving said intermediate drive signal for generating said servo drive signal, said pole-zero integrating filter having a pole-zero point with an adjustable frequency whereby the operation of the pole-zero integrating filter means can be changed by changing the frequency of said pole-zero point, said pole-zero integrating filter being connected to the control means for changing the frequency of said pole-zero point of the filter to in said second mode to match the changes in said zero-pole frequency of said differentiating zero-pole filter.

6. In the servo positioning system set forth in claim 5, further including, in combination:

a velocity range selector in the control means connected to said differentiating zero-pole filter, to said dynamic range changing means and to said integrating pole-zero fitler for supplying dynamic range indicating signals thereto to indicate a current velocity dynamic range such that the dynamic range of said differentiated analog signal being processed in said circuit means remains within a predetermined dynamic range irrespective of an increased dynamic range of said relative position signal and servo drive signal as the relative velocity of the moveable members change.

7. In the servo positioning system set forth in claim 5, further including, in combination:

velocity profile circuits in the control means being connected to said drive signal generating means for supplying, during said second mode, a velocity reference signal thereto always having a dynamic range within said predetermined dynamic range irrespective of actual relative velocity of the relative members.

8. In the servo positioning system set forth in claim 7, further including an optical recording member having addressable parallel extending tracks and data storing locations in the tracks, in combination:

a frame movably mounting said optical recording member;

said second relatively moveable member being said optical recording member, an intermediate member movably mounted on the frame for reciprocating motions transverse to the parallel extending tracks and said first relatively moveable member being movably mounted on the second relatively moveable member for reciprocating motions transversely to the parallel extending tracks; and said position sensing means including an objective lens mounted on said first relatively moveable member for optically sensing said data locations and tracks including relative movement of the objective lens transversely to the tracks.

9. In the servo positioning system set forth in claim 8, further including, in combination:

said optical recording member being a disk-shaped member with said tracks being circular radially-spaced apart and the data locations being circumferentially identifiable and being rotatably mounted on the frame and said motions transverse to the tracks having a substantial motion component which is radial of the circular disk and the sensing means detecting and indicating each crossing of the tracks by the objective lens.

10. In a method of operating a velocity single-loop servo-positioning system, two relatively movable members being operatively connected to said servo-positioning system for being relatively moved by said servo-positioning system, means connected to the servo-positioning system and to the relatively moveable members for indicating to the servo-positioning system any relative movement of said relatively moveable members as a position-error signal, the steps of:

during first periods of operations of said servo-positioning system, setting a reference velocity to zero velocity for operating the single servo-loop servo-positioning system in a position-error-signal control mode for converting said position-error signal to a position-control signal, then generating a servo drive signal from said position-control signal for actuating the positioning system to servo position said relatively-moveable members to a predetermined relative position; and during second periods of operations of said servo-positioning system interleaved with said first periods of operations, indicating said reference velocity in a predetermined velocity profile signal for operating the single servo-loop servo-positioning system in a velocity-error signal-control mode, during said second periods, comparing the position error signal to said velocity profile signal for generating said servo drive signal for actuating the positioning system to servo position said relatively-movable members from a first relative position to a second relative position spaced from the first relative position by a predetermined distance;

during said first periods operating the single servo loop for converting said position error signal to a position control signal, said position error signal having a first predetermined dynamic range; and during said second periods, adjusting the dynamic range of the position error signal from a given dynamic range whenever said given dynamic range is greater than said first predetermined dynamic range to an intermediate signal having said first predetermined dynamic range, operating the single servo loop to process the intermediate signal to generate a first position drive signal having said first predetermined dynamic range, and then adjusting the dynamic range of the first position drive. signal to a second position drive signal having said given dynamic range and supplying the second position drive signal to the motive means as said servo drive signal during said second periods.

11. In a single-loop velocity-controlled positioning servo system, an actuator to be controlled, position sensing means coupled to the actuator for generating a tracking error signal (TES) that indicates by a predetermined null signal amplitude that the actuator is at a center line of an elongated track of a disk data storage member and indicates by a sinusoid that the position sensing means is radially crossing said tracks of said disk data storage member, said TES having a first dynamic range while indicating said null and the sinusoid having variable dynamic range related to a speed of said track crossing, means for supplying a velocity reference signal;

the improvement including, in combination:

an input adjustable differentiating filter (zero-pole), having a predetermined transfer function, connected to the position sensing means for receiving TES for differentiating TES to produce a differentiated TES, termed variable TES', and having means for limiting the variable dynamic range of said variable TES' to said first predetermined dynamic range for producing a compressed TES';

a rectifier connected to the input adjustable filter for receiving TES' for supplying positive and negative rectified TES' signals;

a single-pole triple-throw electronic switch means having one output terminal and three input terminals, an input terminal (F) being connected to said input filter for receiving said TES', an input terminal (52) being connected to the rectifier for receiving said negative rectified signal and an input terminal (53) being connected to the rectifier for receiving said positive rectified signal;

switch control means connected to the electronic switch means and operative to actuate the electronic switch means to connect the input terminal (F) to said output terminal for effecting track following by the actuator, to connect the input terminal (52) to the output terminal for effecting inward radial seeks by the actuator and to connect the input terminal (53) to the output terminal for effecting radially outward seeks by the actuator;

summing means, including range expanding means, connected to the output terminal of the electronic switch for receiving the compressed TES' and for expanding the compressed TES' to the original dynamic range of the variable TES' and having an input reference terminal for receiving a control signal to be compared with the received compressed TES' and an output means for supplying an error signal representative of the comparison of the velocity reference signal and the variable TES';

an output adjustable integrating filter connected to the summing means for receiving said error signal and having a transfer function that is an inverse of said predetermined transfer function of said input filter means for supplying a position error signal (PES);

circuit means coupling the output adjustable filter to said actuator for transferring said PES to the actuator for controlling position of the actuator with respect to said tracks and including an integrating function for integrating the PES; and range control means connected to said adjustable filters, speed sensing and indicating means in the range control means and connected to the position sensing means to detect and indicate said radial track-crossing speed of the actuator with respect to said tracks, filter adjusting means connected to both said adjustable filters and to said speed sensing and indicating means for responding to the indicated radial speed for actuating the adjustable filters to change the dynamic range of signals flowing through the respective filters to be decreased and increased in dynamic range, respectively for increasing and decreasing radial speed of said actuator whereby the dynamic range of said flowing signals in said summing means is always within said first predetermined dynamic range irrespective of said indicated radial speed of said actuator.

* * * * *

UNITED STATES PATENT AND TRADEMARK OFFICE
CERTIFICATE OF CORRECTION

PATENT NO.  :   5,257,251

DATED       :   October 26, 1993

INVENTOR(S) :   W. Wai-Chung Chow, et al.

It is certified that error appears in the above-identified patent and that said Letters Patent is hereby corrected as shown below:

At column 8, line 11, the word "an" should be --and--; at line 29, the word "fitler" should be --filter--.

Signed and Sealed this

Fourteenth Day of June, 1994

Attest:

BRUCE LEHMAN

*Attesting Officer*   *Commissioner of Patents and Trademarks*